US007730196B2

(12) United States Patent
Hill et al.

(10) Patent No.: US 7,730,196 B2
(45) Date of Patent: Jun. 1, 2010

(54) EFFICIENT TRANSFER OF MESSAGES USING RELIABLE MESSAGING PROTOCOLS FOR WEB SERVICES

(75) Inventors: Richard D. Hill, Kirkland, WA (US); Stefan R. Batres, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1579 days.

(21) Appl. No.: 11/003,848

(22) Filed: Dec. 3, 2004

(65) Prior Publication Data
US 2006/0133278 A1    Jun. 22, 2006

(51) Int. Cl.
G06F 15/16 (2006.01)
(52) U.S. Cl. .................. 709/230; 709/228; 709/232; 709/235
(58) Field of Classification Search .............. 709/230, 709/228, 232, 235
See application file for complete search history.

(56) References Cited

U.S. PATENT DOCUMENTS

2005/0021830 A1* 1/2005 Urzaiz et al. ............... 709/234
2008/0256272 A1* 10/2008 Kampmann et al. ......... 710/57
2008/0317017 A1* 12/2008 Wiemann et al. ........... 370/389

FOREIGN PATENT DOCUMENTS

EP    1 463 249    3/2004
EP    1 462 941    9/2004

OTHER PUBLICATIONS

Bilorusets et al. Web Services Reliable Messaging Protocol. Mar. 13, 2003.*

IBM/Microsoft "Reliable Message Delivery in a Web Services World: A Proposed Architecture and Roadmap" Joint White Paper Mar. 13, 2003, the whole document.

*Web Services Reliable Messaging TC: WS-Reliability 1.1*, Kazunori Iwasa, et al. eds., Committee Draft 1.086, Aug. 24, 2004, pp. 1-72, available at http://docs.oasis-open.org/wsrm/2004/06/WS-Reliability-CD1.086.pdf.

Bilorusets, et al., *Web Services Reliable Messaging Protocol (WS-ReliableMessaging)*, Copyright 2002-2004 BEA Systems, Inc., International Business Machines Corporation, Microsoft corporation, Inc., and TIBCO Software, Inc., Mar. 2004, pp. 1-40, available at ftp://www6.software.ibm.com/software/developer/library/ws-reliablemessaging200403.pdf.

(Continued)

*Primary Examiner*—Larry Donaghue
*Assistant Examiner*—Nicholas Taylor
(74) *Attorney, Agent, or Firm*—Workman Nydegger

(57) ABSTRACT

The present invention provides for flow and congestion control mechanisms in accordance with a Reliable Message protocol for Web Services (RM-WS). For flow control, one endpoint informs another endpoint of its available buffer size by including buffer size information in response messages. The response messages, typically RM-WS infrastructure messages, are then used to determine an upper limit on the number of messages that can be sent to the acceptor in order to prevent resending messages due to buffer overrun. In the case of congestion control, embodiments provide for increasing the number of in-flight messages until a failure point is found. The last successful rate below the failure point is the closest known point to the optimum point. Example embodiments then reset and try again raising the rate back to the last known good point and fine tuning from there using an algorithm that asymptotes the optimum rate.

23 Claims, 4 Drawing Sheets

OTHER PUBLICATIONS

Fielding, et al., part of *Hypertext Transfer Protocol—HTTP/1.1*, Introduction, pp. 1-5, *available at* http://www.w3.org/Protocols/rfc2616/rfc2616-sec1.html.

Fielding, et al., part of *Hypertext Transfer Protocol—HTTP/1.1*, 10 Status Code Definitions, pp. 1-11, *available at* http://www.w3.org/Protocols/rfc2616/rfc2616-sec10.html.

Banks, et al., *HTTPR Specification*, Francis Parr ed., Apr. 1, 2002, pp. 1-57, *available at* http://www-128.ibm.com/developerworks/webservices/library/ws-httprspec/index.html.

*Web Services Architecture*, David Booth, et al., eds., W3C Working Group Note, Feb. 11, 2004, pp. 1-106, *available at* http://www.w3.org/TR/ws-arch/.

* cited by examiner

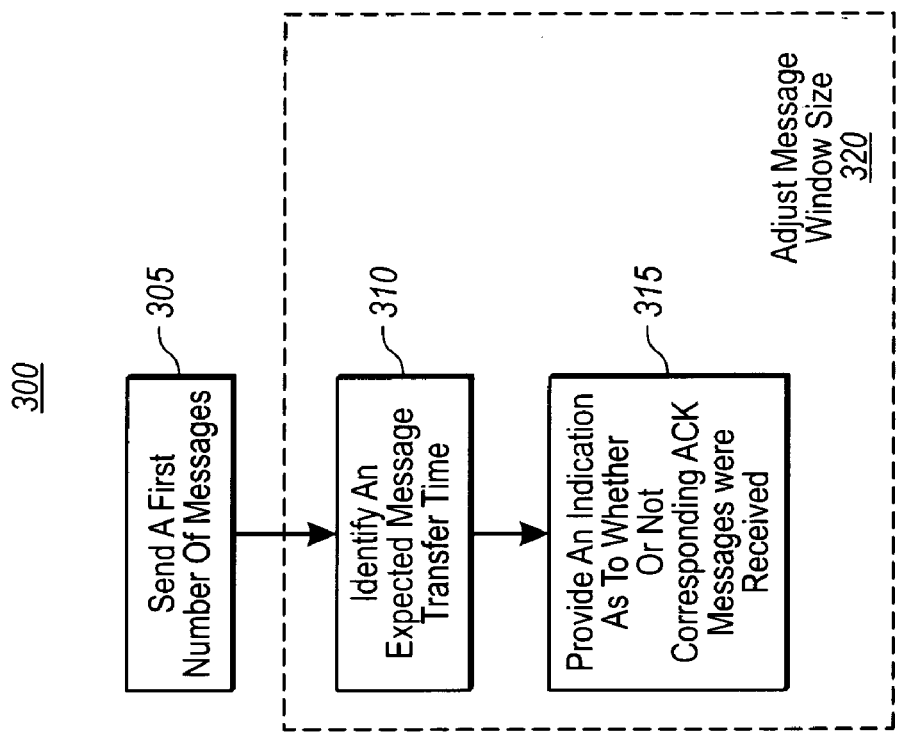

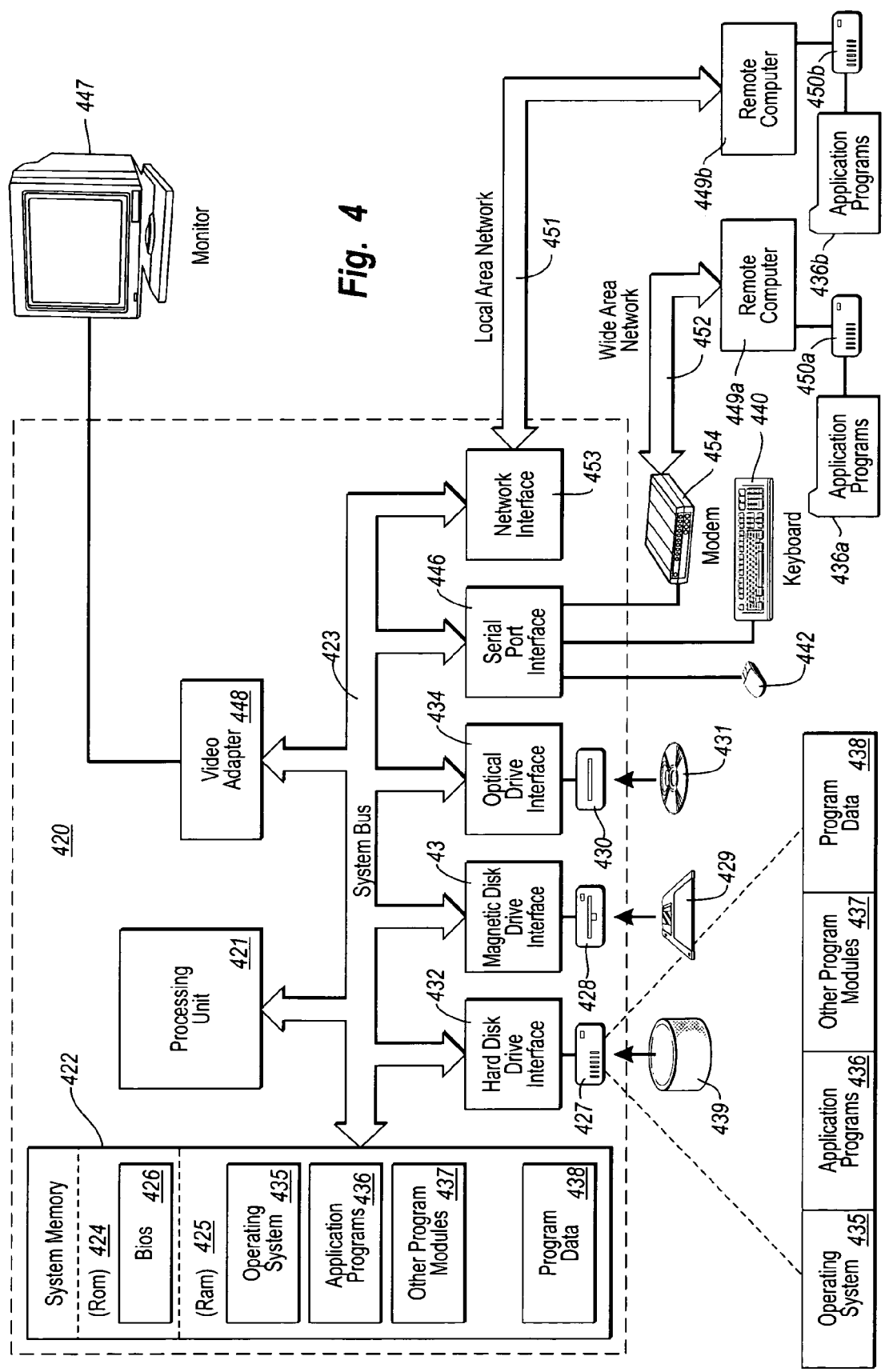

EFFICIENT TRANSFER OF MESSAGES USING RELIABLE MESSAGING PROTOCOLS FOR WEB SERVICES

CROSS-REFERENCE TO RELATED APPLICATIONS

N/A

BACKGROUND OF THE INVENTION

1. The Field of the Invention

The present invention generally relates to reliable messaging of Web Services. In particular, the present invention provides for an efficient transfer of messages in accordance with Reliable Messaging protocols for Web Services for flow control between two endpoints and congestion control across the network wire.

2. Background and Related Art

Computer networks have enhanced our ability to communicate and access information by allowing one computer or device (hereinafter referred to as a "computing device" or "computing system") to communicate over a network with another computing system using electronic messages. When transferring an electronic message between computing systems, the electronic message will often pass through a protocol stack that performs operations on the data within the electronic message (e.g., parsing, routing, flow control, etc.). The Open System Interconnect (OSI) model is an example of a network framework for implementing a protocol stack.

The OSI model breaks down the operations for transferring an electronic message into seven distinct layers, each designated to perform certain operations in the data transfer process. While protocol stacks can potentially implement each of the layers, many protocol stacks implement only selective layers for use in transferring data across a network. When data is transmitted from a computing system, it originates at the application layer and is passed down to intermediate lower layers and then onto a network. When data is received from a network it enters the physical layer and is passed up to the higher intermediate layers and then is eventually received at that application layer. The application layer—the upper most layer—is responsible for supporting application and end-user processing. Further, within the application layer there may reside several other layers (e.g., the Simple Open Access Protocol (SOAP) layer). Another layer incorporated by most protocol stacks is the transport layer. An example of a transport layer is the Transmission Control Protocol (TCP).

Web Services (WS) have been a driving force in advancing communications between computing systems and are turning the way we build and use software inside-out. Web Services let applications share data and—more powerfully—invoke capabilities from other applications without regard to how these applications were built, what operating systems or platform they run on, or what devices are used to access them. Web Services are invoked over the Internet by means of industry-standard protocols including SOAP, XML (eXtensible Markup Language), UDDI (Universal, Description, Discovery and Integration), WSDL (Web Service Description Language), etc. Although Web Services remain independent of each other, they can loosely link themselves into a collaborating group that performs a particular task.

Current WS technologies offer direct SOAP-message communication between an initiator (e.g., a client) and an acceptor (e.g., a service). In the common bi-directional messaging case, a SOAP request message is sent from the initiator to the acceptor and a SOAP replay message is sent in response thereto. Another communication variant between endpoints is unidirectional message, where the initiator sends a message to the acceptor with no response.

A key benefit of the emerging WS architecture is the ability to deliver integrated, interoperable solutions. Because, however, Web Services provide various services from different business, originations, and other service providers via unreliable communication channels such as the Internet, reliability of WS becomes an increasing important factor. Reliability of WS is impacted by several factors including but not limited to, the reliability of the Web Service end points; reliability characteristics of the communication channel over which the Web Services are accessed; performance and fault-tolerance characteristics; and the extent to which Web Services can handle concurrent client access.

There have been attempts at accomplishing reliable messaging of Web Services by choosing a reliable transport protocol over which the messages (e.g., SOAP messages) are exchanged between endpoints. For example, a reliable messaging transport such as message-queues can be used to deliver messages reliably between initiators and acceptors. Message-queuing communication technologies enable applications on different systems to communicate with each other by sending messages to queues and reading messages from queues that are persisted across failures for reliability.

Although queuing systems offer a transport that can be used to carry SOAP messages reliably, there are several drawbacks to such systems. For instance, these systems offer solutions for an asynchronous operation where the requests (and possibly their responses) are transferred and processed with isolation. Accordingly, these systems are typically heavyweight in terms of resources; involving multiple intermediaries with durable transacted message stores and with considerably more complexity in deployment, programming model and management. All of this is unnecessary for reliable direct communication, and detracts from the goal of minimizing latency. Further, the program model does not directly support request-response style programming or sessions. Accordingly, the queued communication model is different from the current "interactive" Web Services model, and does not address critical "connected" scenarios and "interactive" applications. For example, it is not well suited for cases where a response is expected in a timely manner, or for cases where distributed-transaction-context need to be shared between initiator and acceptor.

There have also been attempts at defining reliable transfer layers over fundamentally unreliable transport protocols, e.g., reliable HTTP or HTTPR. A common problem, however, that plagues this solution—as well as the queuing solution—is that reliable messaging can be achieved only if the specific reliable transport protocol is used for communication between the initiator and the acceptor. The fundamental nature of Web Services calls for independence from specific vender platform, implementation languages and specific transport protocols. In a generic case, an initiator may not be able to transmit a message directly to an acceptor using a particular protocol (e.g., acceptor does not support the protocol) or the message may need to pass through multiple hops after leaving the sending node prior to arriving at that destination node. Depending on the nature of the connectivity between the two nodes involved in a particular hop, a suitable transport protocol that does not offer reliable messaging characteristics may have to be chosen.

Intermediaries may also exist at different levels in the protocol stack; and therefore not offer full end-to-end reliability. For example, transport protocols may offer reliability across lower level intermediaries (e.g., IP level intermediaries—e.g., IP routers). The transport protocol may end, however, at a SOAP intermediary or application layer. Accordingly, the transport protocol may not be able to offer reliability across that intermediary, i.e., no end-to-end reliability across the application layer.

More recently, various Reliable Messaging protocols for Web Services (hereinafter referred to as "RM-WS protocols"), e.g., WSReliableMessaging, offer solutions to the above identified-deficiencies of current reliable messaging systems. These protocols are transport agnostic connected protocols that allow messages to be delivered reliably between end-point applications in presences of software component, system or network failures. Accordingly, RM-WS protocols offer solutions for reliable, end-to-end, session-oriented communication between an initiator and an acceptor.

These RM-WS protocols are akin to TCP in that TCP offers reliable, exactly-once, in-order delivery of a stream of bytes from a TCP sender to TCP receiver across Internet Protocol (IP) routers and multiple networks. Reliable Messaging protocols for WS offer the same and more for messages (note: the unit of transfer is a message, not a byte) across multiple intermediaries (including SOAP level intermediaries), transports and connections. Although TCP and RM-WS protocols are both "reliable" protocols, because RM-WS resides at the application or SOAP layer in the OSI model, RM-WS protocols provide for reliable messaging regardless of the transport protocol used to transfer the data. Accordingly, RM-WS protocols are not tied to a particular transport or other protocol used to transfer message between endpoints.

Although a few RM-WS protocols have been around for some time there are still several drawbacks and deficiencies of these protocol specs. For example, there are currently no solutions defined by these protocols for flow control of messages between endpoints. Typically, an acceptor in a reliable message exchange has a buffer where received messages are stored for delivery to the processing application. This allows for the flexibility in the system since the processing application does not need to be available to process messages as soon as they are received. The buffer, however, is limited in capacity since any system has finite resources available to it (limited by hardware and/or software). As such, an issue may arise if the receiving application is processing the messages at a rate slower from which they are sent and/or received. In such case, the acceptor buffer will fill up and the received messages would not be read from the transport or may be dropped (which is the action of reading the message from the transport but not capturing it in the buffer for lack of space); and therefore not sending a receipt acknowledgment for that message.

Message dropping is permitted by typical RM-WS protocols and is not considered a fatal failure; since in the absence of a receipt acknowledgement from the acceptor, the initiator would retry the transfer. Retries, however, cause network and system resource waste; and therefore, a need arises for an efficient mechanism for an initiator to know how many messages it can send to the acceptor without them being dropped.

Similar to the flow control problem described above, congestion control over the network wire is also a concern. Typically, messages sent over a network are transferred over several transport connections bridged by various nodes, e.g., routers. The different transport connections may be of different speeds (e.g., a 100 mbps Ethernet connection from the initiator to a node and a 56 kbps dial-up connection from the node to the acceptor). Due to the speed differences of the transport connections, the connection from a node to an acceptor could get backed-up, meaning that the network cannot take any new content for delivery since some of the content needs to be taken off first. This means that the node has to slow down its relay transmission causing it to buffer incoming messages before it can send them to there destination. Similar to other computing resources, nodes can only buffer so many messages before they need to start dropping new incoming ones. Although buffering is an acceptable technique for handling transient's traffic spikes, to minimize latency the system should strive to minimize the amount of buffering occurring in the intermediaries. Further, other reasons for dropping messages include the number of incoming links to the node all vying for the same outgoing link, the receiver being slow in processing requests or a burst of activity at the node.

Regardless of the reason for the network dropping messages, as previously mentioned, in a reliable messaging system dropped messages need to be retried to ensure delivery. If in-order delivery is required, then processing of messages whose sequence number is higher then the dropped message would be delayed until the dropped message is received, resulting in processing inefficiency on the acceptor side. Further, retrying dropped messages results in even more messages on the link from the initiator to the node, which could ultimately result in even more dropped messages—i.e., congestion, performance hindrance and resource waste.

Accordingly, a need arises for a solution that will not only adjust for flow control but will also adapt to changes for congestion over the network wire. As can be recognized, the problem extends to scenarios where multiple nodes, e.g., routers, are employed on the path from the initiator to the acceptor. As such, the solution should not take into consideration the number of routers, since that number is unknown to the initiator and may in fact change in time. Further, the solution should also be able to adapt to changes in network bandwidth, performance and topology.

BRIEF SUMMARY OF THE INVENTION

The above-identified deficiencies and drawbacks of current Reliable Messaging protocols for Web Services are overcome in accordance with exemplary embodiments of the present invention. For example, the present invention provides for efficiently transferring messages between endpoints in accordance with a Reliable Messaging protocol for WS (RM-WS) by dynamically determining a message window size for sending messages based on an acceptors available buffer size. Further, the present invention provides for controlling network congestion by adjusting a transmission window for sending messages to an end-point in accordance with RM-WS protocol in order to adapt to such things as changes in network bandwidth, performance and topology.

For example, one embodiment directed towards flow control provides for establishing, at an application layer, a sequence session between an initiator and an acceptor in accordance with a RM-WS protocol. A message that includes expected buffer size information is received over the sequence session—the acceptor buffer size information indicating an amount of available memory for buffering messages waiting to be processed by an application. Further, a number of in-flight messages are identified, which are messages that have been sent to the acceptor without receiving corresponding acknowledgements in accordance the RM-WS protocol. Based on the acceptor buffer size information and the number of in-flight messages, a message window size is calculated representing an upper limit on the number of messages that can be sent to the acceptor in order to prevent resending messages due to buffer overrun.

In another example embodiment for congestion control, the present invention provides for sending, to an acceptor over an established sequence session in accordance with RM-WS protocol, a number of messages corresponding to a message window size. The message window size representing an upper limit on a number of in-flight messages to send to the acceptor on a network wire. Based on the message window size, an expected message transfer time is identified, which defines an expected time limit between sending the number of messages and receiving corresponding acknowledgement messages. Thereafter, an indication as to whether or not the corresponding acknowledgement messages were received before the expected message transfer time expires is provided, wherein the indication is used for adjusting the message window size and/or retry time period in order to prevent resending messages due to network congestion.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flow diagram of a method of efficiently transferring messages between endpoints in accordance with exemplary embodiments of the present invention;

FIG. 3 illustrates a flow diagram of a method of controlling network congestion in accordance with exemplary embodiments of the present invention; and FIG. 4 illustrates an example system that provides a suitable operating environment for the present invention.

DETAILED DESCRIPTION OF THE PREFERRED EMBODIMENTS

The present invention extends to methods, systems and computer program products for flow and congestion control in a Reliable Messaging protocol for Web Services environment. The embodiments of the present invention may comprise a special purpose or general-purpose computer including various computer hardware, as discussed in greater detail below.

The present invention is directed towards extensions of Reliable Messaging protocols for Web Services (hereinafter referred to as "RM-WS" protocols), which describes protocols that allow messages to be delivered reliably between distributed applications in the presence of software component, system or network failures. Reliable Messaging protocols for Web Services facilitate the successful transmission of a message from a source (hereinafter "an initiator") to a destination, e.g., a service, (hereinafter "an acceptor") and ensures that error conditions are detectable. These protocols are transport agnostic, allowing them to be implemented using different network transfer technologies. Further, various implementations of reliable messaging protocols hide intermittent communication failures from the applications, and may provide recoverability in the case of system failures.

Example embodiments provide efficient transfer of messages using RM-WS protocol by dynamically determining a message window size for sending the messages based on an acceptor's available buffer size. More particularly, the present invention provides for a flow control mechanism where the acceptor lets an initiator know how much room there is in the acceptor's buffer. The acceptor buffer size information is included in response messages, e.g., infrastructure acknowledgement response messages, which are then used by an initiator to calculate a message window size. This calculated window size then defines an upper limit on the number of messages that can be sent to the acceptor in order to prevent resending messages due to buffer overrun.

Figure 1A:
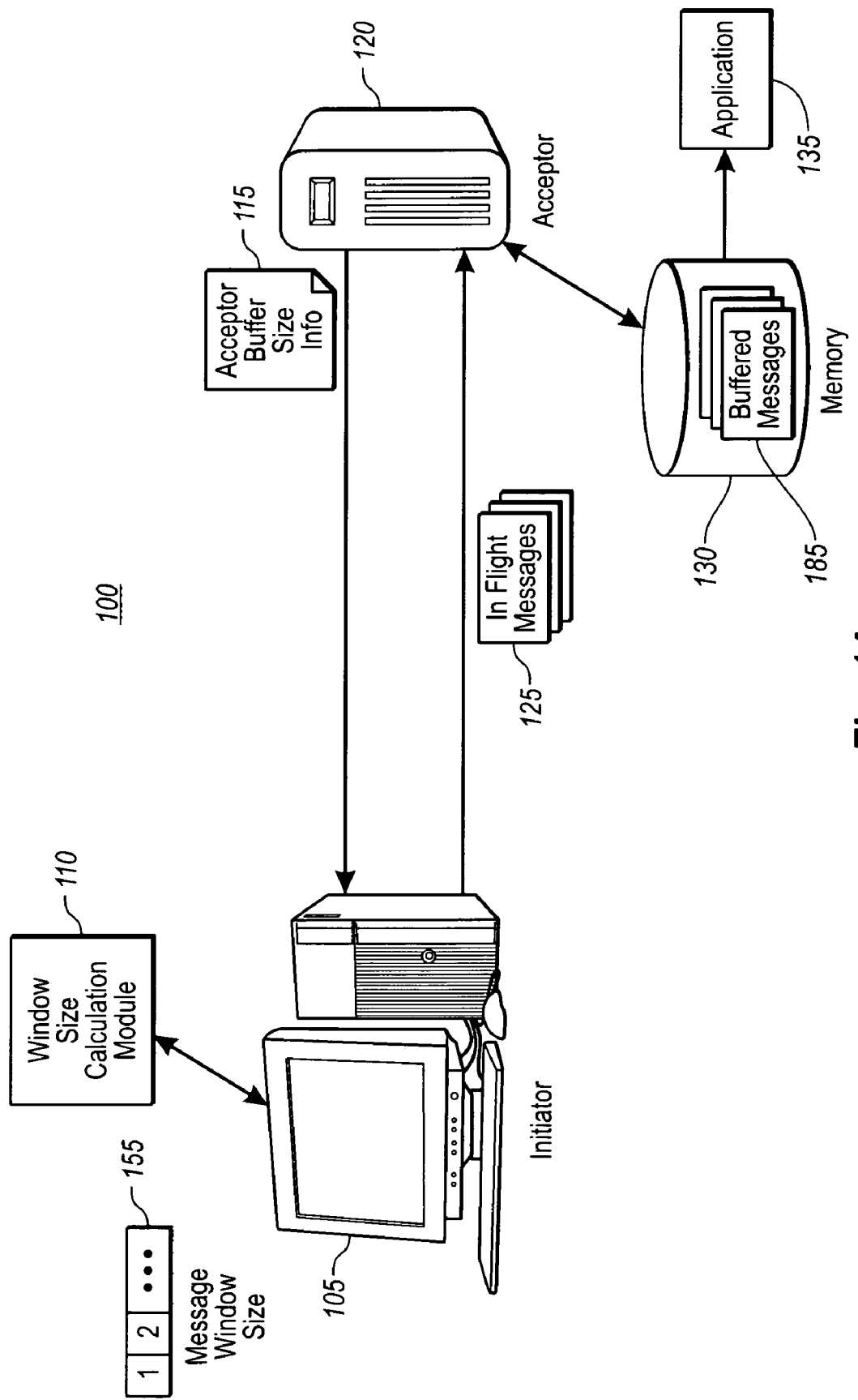
FIG. 1A illustrates a computing system configured to adjust for flow control changes between two endpoints in accordance with exemplary embodiments of the present invention.

FIG. 1A illustrates the above described example flow control embodiment. FIG. 1A shows a distributed network 100 that includes an initiator 105 and an acceptor 120. A connection is established between initiator 105 and acceptor 120 for exchanging messages in accordance with a RM-WS protocol. Once established, acceptor 120 can periodically send information about its buffer size within a message (e.g., infrastructure message 115) to the initiator 105. The acceptor buffer size information will indicate an amount of available memory 130 for buffered messages 185 waiting to be processed by an application 135.

Note that although infrastructure messages 115 will typically be used to send the acceptor buffer size information to initiator 105, application layer messages (e.g., messages sent as output from the acceptor) may also include extensions for identifying the available size of memory for the acceptor 120. Further, the infrastructure messages 115 will typically be acknowledgement response messages in accordance with the RM-WS protocol; however, the present invention is not limited to any particular type of infrastructure message 115. Accordingly, the use of infrastructure message 115 in delivering the acceptor buffer size information—as well as any particular type of infrastructure message mentioned—is used for illustrative purposes only and is not meant to limit or otherwise narrow the scope of the present invention unless explicitly claimed.

Regardless of the type of message, upon receiving an indication of the acceptor's buffer size within infrastructure message 115, initiator 105 may send up to the number of messages indicated by the buffer size information. In other words, acceptor memory 130 already has a certain number of buffered messages 185 that are waiting to be processed by application 135. Accordingly, the maximum number of messages initiator 105 can send to acceptor 120 before messages are dropped is determined by the available buffer size within memory 130.

Note that the acceptor buffer size information within infrastructure message 115 is an upper limit on the number of messages initiator 105 will send to the acceptor 120. This upper limit, however, may be modified based on such things as a number of in-flight messages, number of previously received acknowledgements, number of messages currently being acknowledged, etc. For example, initiator 105 can identify a number of in-flight messages 125, which are messages that have been sent to the acceptor without receiving corresponding acknowledgements in accordance with the RM-WS protocol. These in-flight messages 125 may be messages that were dropped by acceptor 120 or lost on the wire. The in-flight messages 125 may also be messages that have been received by acceptor 120 but acknowledgements for the messages were either lost or are in transit to the initiator 105 before the following described calculation. Another possibility is that the in-flight messages 125 may be delayed at an intermediary in the network, e.g., a router or SOAP intermediary.

In any event, upon knowing the number of in-flight messages 125, initiator 105 can utilize widow size calculation module 110 to subtract the number of in-flight messages 125 from the available acceptor buffer size when calculating a message window size 155. As previously mentioned, a message window size 155 represents an upper limit on the number of messages that can be sent to the acceptor 120 in order to prevent resending messages due to buffer overrun.

Note that the buffer information size within the infrastructure message 115 will typically be in terms of messages, rather then bytes. Similarly, the message window size 155 may also be in terms of a number of messages rather then a particular byte size. Further, because the initiator 105 keeps track of the number of messages it sent, e.g., in-flight message 125, and the number of spaces available in the acceptor's 120's memory 130, the initiator always knows how much room is available on the acceptor's 120's side. Accordingly, the initiator 105 does not try to estimate the message processing rate of the processing application 135, but rather depends on the acceptor 120 telling it how many messages it can buffer. This makes the window size calculation module 110 work under any processing rate, such as a constant-rate processing or a random-burst-processing.

Other example embodiments address the issue arising from the fact that infrastructure messages 115, e.g., acknowledgement response messages, are unreliable (i.e., may be lost in transit from the acceptor to the initiator). In such embodiments, and as described in greater detail below, when the message window size 155 is equal to zero, the initiator 105 can periodically probe for the available space by sending, e.g., acknowledgement request messages in accordance with the particular RM-WS protocol. In response to the acknowledgement request message, corresponding acknowledgement response(s) will typically contain the current acceptor buffer size information.

Note that information other then buffer size information and the number of in-flight messages 125 can be utilized by window size calculation module 110 in calculating the message window size 155. For example, the number of current messages being acknowledged when the infrastructure message 115 is an acknowledgement response message may also be used in reducing the message window size 155. In addition, in the case of batch acknowledgments, the number of previously received acknowledgment responses may need to be used as well.

The following is an example of an algorithm that can be used to calculate the message window size 155 in accordance with exemplary embodiments. At the start of the communication between initiator 105 and acceptor 120 the received window size is assumed to be equal to one and the number of in-flight messages would be equal to zero. Further, previously received acknowledgements are also set at zero. On the initiator's 105's side, the algorithm may look as follows. If the message window size 155 is greater than zero, the initiator 105 can send a message; increase the in-flight message count by one; and decrease the message window size 155 by one as well.

If, on the other hand, the received window size equals zero, example embodiments block the sending of messages until a recalculation of the window size is greater than zero. When the window size becomes greater than zero the aforementioned process is repeated.

On receiving an acknowledgement response or infrastructure message 115 the example algorithm performs the following. First, it will extract the acceptor buffer size information from the message 115. Further, window size calculation model 110 computes the number of messages currently being acknowledged. As such calculation module 110 may need to determine a number of new acknowledgements, which is equal to the messages currently being acknowledged minus the previously received acknowledgements. Note that this last calculation may be needed for those instances where the RM-WS protocol batches the acknowledgement response; however, the present invention is not necessarily limited to such batching process. Accordingly, the calculation of the number of new acknowledgements by taking the difference of the number of previously received acknowledgements and the messages currently being acknowledged is used for used for illustrative purposes only and it is not meant to limit or otherwise narrow the scope of the present invention unless explicitly claimed.

Nevertheless, if the number of new acknowledgements is used, the in-flight messages 125 include the number of previously sent messages minus the number of new acknowledgements. Further, the number of previously received acknowledgements now becomes equal to the messages currently being acknowledged (again in the case of a batch acknowledgement). Finally, the message window size 155 becomes equal to the acceptor buffer size information minus the number of in-flight messages 125 calculated using window size calculation module 110

The following example illustrates the above-described message widow size tracking process. In this example, the initiator 105 sent ten messages to the acceptor 120 and has just received an acknowledgement 115 for those ten messages, which includes acceptor buffer size information indicating that the acceptor 120 can buffer five messages. The initiator 105 sends messages eleven through fifteen and stops sending more messages. Next, the initiator 105 receives an acknowledgement 115 for messages one through thirteen and acceptor buffer size information that five spaces are available in the acceptor's 120's receive memory 130. Knowing that two messages are in-flight 125 to the acceptor 120, the initiator 105 would only send three more messages to the acceptor, and then wait for more space to become available.

Another example embodiment advantageously provides for a dynamically configurable memory 130 buffer size on a per connection basis. This feature allows for the balancing of system resources such that the flow can be optimally achieved for each connection by appropriately allocating memory 130 for initiators 105 who have high (or low) buffering needs. Unlike TCP with hard-coded memory allocation for buffering messages on a receiving side, example embodiments allow the acceptor's 120's memory 130 capacity (i.e., total buffer size to allocate for the connection) to be configurable based on such things as processing speed of the initiator 105, the complexity of the request, etc.

For example, an established connection to an initiator 105 that periodically only sends one message would not need large amounts of memory 130 for buffered messages 185. Accordingly, a negotiation between the initiator 105 and the acceptor 120 may occur in order to determine the particular needs of the initiator 105 and the corresponding allocation of memory 130. Further, this negotiation process can occur for each established connection in order to properly balance memory 130 resources among various distributed devices.

Other example embodiments also provide for congestion control by adjusting a transmission window and/or a retry time period for sending messages to an endpoint in order to adapt to such things as changes in network bandwidth, performance and topology. The mechanism involves measuring the round-trip time that elapses from the point a message is sent to the time where a corresponding acknowledgment is received. Below is a brief description of an example of how the congestion control process may work.

At first, exemplary embodiments aggressively seek an approximate rate close to a desired or optimal rate. The present invention does so by, e.g., exponentially increasing the number of in-flight messages until a failure point is found. The last successful rate below the failure point is the closest known point to the optimum point. Example embodiments then reset and try again raising (e.g., using exponential rate increases) the rate back to the last known good point and fine tuning from there using an algorithm that asymptotes the optimum rate.

Figure 1B:
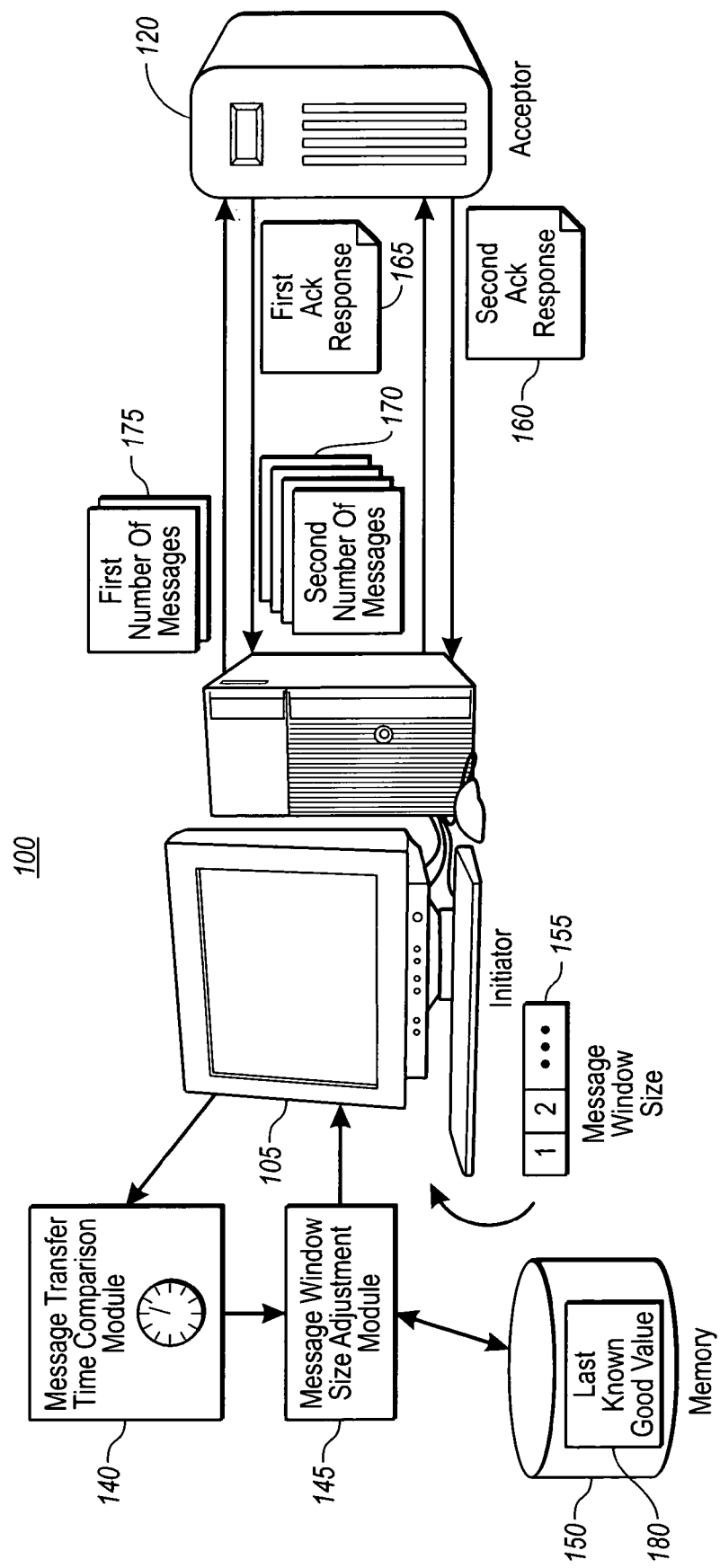
FIG. 1B illustrates an computing system configured to adapt to congestion changes on a network wire in accordance with exemplary embodiments of present invention.

FIG. 1B illustrates a network 100 for performing some of the above-identified embodiments. As shown, initiator 105 can send a first number of messages 175 to acceptor 120. When acceptor 120 receives the first number of messages 175 a first acknowledgement response 165 is sent to initiator 105. Upon receiving the first acknowledgement response 165 a message transfer time comparison module 140 can be utilized for determining how a message window size 155 should be adjusted and/or if a retry time period should be adjusted (either faster or slower).

For example, message transfer time comparison module 140 determines an expected message transfer time, which defines an expected time limit between sending the number of first messages 175 and receiving at the initiator 105 a corresponding first acknowledgement response 165. In other words, there is an expected message transfer time defined by an expected round-trip time from sending messages 175 to the acceptor 120 and receiving corresponding acknowledgements 165 at the initiator 105. As discussed in greater detail below, typically the expected message transfer time will be based on a message window size 155, which represents an upper limit on a number of in-flight messages to send to the acceptor on a network wire.

Once the message transfer time comparison module 140 determines the expected message transfer time, it compares the expected message transfer time with the actual time for sending the first number of messages 175 to the acceptor 120 and receiving the first acknowledgement response 165 back. If the first acknowledgment response 165 is received before the expected message transfer time expires, message transfer time comparison module 140 will give a success indication to the message window size adjustment module 145. Accordingly, message window size adjustment module 145 will increase the message window size 155 and record the success as the last known good value 180 in memory 150. In other words, the previous message window size 155 is recorded as the last known good value 180 and the previous message window size 155 is increase by some factor, typically an exponential increase. A second number of messages 170 corresponding to the increased message window size 155 is then sent to the acceptor 120 and a second acknowledgement response (or responses) 160 is received for the second number of messages 170, and process is continued until a failure occurs.

If, on the other hand, the expected message transfer time elapses before receiving the first acknowledgement responses 165 (or second acknowledgment response as the case may be 170), message transfer time comparison module 140 will give a failure indication to the message window size adjust module 145. Note that in such instance, the failure indication may suggest several occurrences have happened. For example, the messages sent (the first number 175 or the increased second number of messages 170) may have been lost. Alternatively, or in conjunction, one or more d to adapt to congestion changes on a network wiror the sent messages 175, 170 may have been lost or received after the expected message transfer time expired.

In any event, the message window size adjustment module 145 will decrease the message window size 155, typically to some value below the last known good value 180 stored in memory 150, and/or increase a retry time period (i.e., make the duration for waiting to retry messages longer). Note that although exemplary embodiments decrease the message window size 155 to some value below the last known good value 180, the present invention is not limited to this particular embodiment. For example, message window size adjustment module 145 may decrease the message window size 155 incrementally until success is achieved, which may or may not be the last known good value 180. Similarly, the above described increase in the message window size 155 upon receiving a success indication does not necessarily have to be an exponential increase, but could also be a small increment thereof. In fact, as described in greater detail below, different algorithms for adjusting the message window size 155 may be used for fine tuning and other purposes. Accordingly, any particular increase or decrease of the window size 155 based upon the success or failure indication is used for illustrative purposes only and it is not meant to limit or otherwise narrow the scope of the present invention unless explicitly claimed.

Nevertheless, when a failure indication is received at message window size adjustment module 145, example embodiments provide that message window size 155 will shrink to a size of one. Thereafter, successive attempts for transferring messages 175, 170 will exponentially increase the message window size 155 to the last known good value 180. Note that the drastic decrease in message window size 155 causes a slow-down in the transmission rate, effectively resetting the exponential growth processes to its initial state. The actual buffer size for sending messages by the initiator 105, however, does not shrink and messages that had already been buffered for sending may not be removed from the buffer, but no new messages may be accepted by the infrastructure (i.e., send operations are blocked), effectively slowing down the initiator 105. New messages may be accepted by the infrastructure once the number of messages in the buffer goes below the effective message window size 155.

After the above described reset, attempts are made to retransmit the oldest message in the initiator's 105 buffer and a new expected message transfer time is set. If the new expected message transfer time expires before receiving a corresponding acknowledgement for the retransmitted message, example embodiments provide for doubling the expected message transfer time and retrying. This process may repeatedly occur until a successful state is reached or until a configurable number of attempts have been made, in which case the transfer may be declared unsuccessful and an error may be raised to the initiator 105 application. This embodiment effectively implements a message back-off retry mechanism, which allows for the congestion on the network 100 to normalize or to reach a steady state.

Upon receiving a successful transfer, the increase of the message window size 155 and transfer rate for messages can again be attempted as discussed above. As previously mentioned, to apply what was learned during the last attempt, example embodiments provide for aggressively increasing the message window size 155 up to the last known good value 180. At this point, message window size adjustment module 145 changes algorithms to try and find an optimum point. For example, embodiments provide for an asymptotical algorithm (and the opportunistic increase of the message window size 155) as follows. When the last known good value 180 for message window size is reached, message window size adjustment module 145 may pick a point between the last failed message window size 155 and the last known good value 180 by dividing the difference by some factor in an attempt to guess the optimum point. If that value is too high (i.e., it's beyond the optimum rate and causes message to be lost or overly delayed) the message window size adjustment module 145 readjusts the factor to a lower one.

Of course, there are other specific implementations or algorithms that can be used to fine tune or adjust the message window size 155. For example, after reaching the last known good value 180 the message window size adjustment module 145 may simply incrementally increase the message window size 155 until an optimum size is achieved. Accordingly, as previously mentioned, the use of any particular algorithm to either aggressively approximate an optimal message window size 155 or to fine tune the message window size 155 is used for used for illustrative purposes only and it is not meant to limit or otherwise narrow the scope of the present invention unless explicitly claimed.

Once the optimum message window size 155 is determined, other example embodiments also provide for periodically attempting to increase the optimum value in order to adjust for an increase in bandwidth. Further example embodiments provide for detecting when a failure occurs indicating a decrease in bandwidth across network 100. In such instance, the message window size 155 may be reset, the growth process as described above may be increased to the last known good value 180, and the fine tuning process may again be implemented. Note that in the case that the last known good value 180 fails, example embodiments provide for determining the previous last known good value, i.e., the one just before the last known good value. This previous value can then be substituted for the last known good value 180 and the above described process may continue.

As noted above to detect failure, exemplary embodiments measure the transfer time, i.e., the time that it takes from sending a message to receiving an acknowledgement for it. The problem is complicated in certain instances where the RM-WS protocol allows acknowledgment responses to be aggregated by the acceptor 120, such that a single acknowledgement response acknowledges the receipt of multiple messages. Accordingly, example embodiment's track the time that passed for transferring each of the messages corresponding to the message window size 155 until a corresponding batched acknowledgement is received. The actual transfer time is then calculated using the mean and/or variance of the aggregate distribution of the round-trip times.

Because the variance in round-trip time will depend on the number of messages acknowledged in the batch, the expected message transfer time should vary based on the message window size 155. In other words, the expected message transfer time will typically increase as the message window size 155 is increased. Note, however, that the expected message transfer time does not necessarily need to be based upon the message window size 155 in, e.g., the case where a one-to-one correspondence between sending a message and receiving an acknowledgement for that message is implemented. Accordingly, basing the expected message transfer time on the message window size 155 is used for illustrative purposes only and it is not meant to limit or otherwise narrow the scope of the present invention unless explicitly claimed.

The following example illustrates various embodiments as described above. In this example, the message window size 155 may be initiated with a window size of one, i.e., only one message may be in-flight from the initiator 105 to the acceptor 120. Accordingly, a message number one may be received by acceptor 120, and a corresponding acknowledgement message number one may be received by initiator 105. Message transfer time comparison module 140 then measures the round trip time and compares it to the expected message transfer time for that particular message window size 155. Assuming that a success is given for the comparison, message window sizes adjustment module 145 increases the message window size 155 to two, wherein messages number two and three are sent and acknowledgement for these messages is received by the initiator 105. Again assuming a successful transfer time, message window size adjustment module 145 will increase the message window size 155 to four, wherein messages number four through seven are sent and corresponding acknowledgements are received. This process continues until a failure is detected.

If the next increase in message window size 155 of eight causes a failure, the algorithm is restarted and aggressively increased to the last known good value 180, which in this case was four. The asymptotical algorithm is then used with an initial value equal to the last known good value 180 plus some delta or change between the last known good value 180 (i.e., four) and the failure point (i.e., eight) divided by some factor. For example, if the factor is two, then the message window size 155 becomes six (i.e., 4+(8−4)/2=6). Assuming the six value fails, then the process tries sending messages according to a message window size 155 of five, wherein if successful five is the optimum choice and if failure four is the optimal choice.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in particular order, the present invention is not necessarily limited to any particular ordering or combination of steps and/or acts. Further, the use of steps and/or acts in the recitation of the claims—and in the following description of the flow charts for FIGS. 2 and 3—are used to indicate the desired specific use of such terms.

FIGS. 2 and 3 illustrate flow charts for various exemplary embodiments of the present invention. The following description of FIGS. 2 and 3 will occasionally refer to corresponding elements from FIGS. 1A and 1B. Although reference may be made to a specific element from these Figures, such elements are used for illustrative purposes only and are not meant to limit or otherwise narrow the scope of the present invention unless explicitly claimed.

FIG. 2 illustrates an example flow chart of a method 200 for efficiently transferring messages between endpoints in accordance with a RM-WS protocol by dynamically determining a message window size for sending messages based on an acceptor's available buffer size. Method 200 includes an act of establishing 205 a sequence session. For example, as shown in FIG. 1A, a sequence session at an application layer (e.g., SOAP layer) may be established between initiator 105 and acceptor 120 in accordance with RM-WS protocol (e.g., WSReliableMessaging). Method 200 also includes an act of receiving 210 over the sequence session a RM-WS message. For example, initiator 105 may receive a message 115 from an acceptor 120 that includes acceptor buffer size information, which indicates the amount of available memory 130 for buffering messages 185 waiting to be processed by an application 135. Typically, the message 115 will be an infrastructure message, e.g., an acknowledgement response message 115.

Thereafter, method 200 further includes an act of identifying 215 a number of in-flight messages. That is initiator 105 can determine the number of in-flight messages 125 that have been sent to the acceptor without receiving corresponding acknowledgement(s) in accordance with the RM-WS protocol. Based on the acceptor buffer size information and the number of in-flight messages, method 200 further includes an act of calculating 225 a message window size. For example, window size calculation module 110 may be used to calculate a message window size 155 based on the acceptor buffer size information within the infrastructure message 115 and the number of in-flight messages 125. The message window size 155 representing an upper limit on the number of messages that can be sent to the acceptor in order to prevent resending messages due to buffer overrun on the acceptor 120.

Exemplary embodiments provide that if the window size is larger than zero, a number of messages corresponding to the calculated message window size 155 may be sent to the acceptor 120. If, on the other hand, the message window size 155 is zero, exemplary embodiments provide for blocking messages from being sent until an infrastructure message (or other message) is received and used to calculate that the message window size 155 is greater then zero. In the event that the infrastructure message is an acknowledgement response message 115 in accordance with the RM-WS protocol, other exemplary embodiments provide for periodically sending acknowledgement request messages to the acceptor 120. In response thereto, acknowledgement response message 115 may be received that includes acceptor buffer size information for recalculating the message window size 155. Accordingly, when the recalculated message window size 155 is greater then zero, a number of messages corresponding to the recalculated message window size 155 may be sent.

As previously mentioned, the buffer information may be in terms of the number of messages that are to be sent and not the number of bytes available in memory. Further, example embodiments provide that the acceptor's total memory allocated for buffering messages waiting to be processed by the application is dynamically configurable on a per connection basis. Moreover, the calculation of the message window size 155 may be further based on the number of messages acknowledged in the acknowledgement message and/or previously received acknowledgements for previously sent messages.

FIG. 3 illustrates an example flow chart of a method 300 for controlling network congestion by adjusting a transmission window for sending messages to an endpoint in accordance with an RM-WS protocol in order to adapt to such things as changes in network bandwidth, performance and topology. Method 300 includes an act of sending 305 a first number of messages. For example, as shown in FIG. 1B, initiator 105 may send a first number of messages 175 to acceptor 120 over an established sequence session in accordance with a RM-WS protocol (e.g., WSReliableMessaging). The first number of messages 175 corresponding to a message window size 155, wherein message window sizes 155s represent an upper limit on number of in-flight messages to send to an acceptor 120 on a network wire.

Method 300 also includes a step for adjusting 320 a message window size. Step 320 includes an act of identifying 310 an expected message transfer time. For example, message transfer time comparison module 140 may be used to identify an expected message transfer time, which defines an expected time limit between sending a number of messages and receiving corresponding acknowledgement messages. Step 320 also includes an act of providing 315 an indication as to whether or not corresponding acknowledgment messages were received. For example, message transfer time comparison module 140 can provide an indication to the message size adjustment module 145 whether or not corresponding acknowledgement messages 165 were received before the expected message transfer time expires. Message window size adjustment module 145 can then use this indication for adjusting the message window size 155 and/or retry time period in order to prevent resending messages due to network congestion.

Other exemplary embodiments provide that the adjustment of the message window size 155 is an increase in the message window size 155 indicating that corresponding acknowledgement message(s) 165 were received before the expected message transfer time expired. After the increase in the message window size 155 other exemplary embodiments provide for sending an increased number of messages corresponding to the increased message window size 155. For example, second number of messages 175 may be sent from initiator 105 to acceptor 120, wherein based on the increased message window size 155 the message transfer time comparison module 140 can identify a second expected message transfer time. The increase expected message transfer time defining an expected time limit between sending the increased number of messages 170 and receiving one or more corresponding acknowledgement messages 160.

Thereafter, message transfer time comparison module 140 can provide an indication as to whether or not the one or more corresponding acknowledgement message 160 for the increased number of messages 170 were received before the second expected message transfer time expired (note: the second expected message transfer time will typically be an increase from the previous value due to the increase in the number of messages sent). In one embodiment, the message window size adjustment module decreases the increased message window size indicating at least one of the following: that one or more of the increase number of messages 170 were lost; that one or more of the corresponding acknowledgement messages 160 for the increased number of messages 170 were lost and/or received after the second expected message transfer time expired. The decrease in the increased message window size may be a size between the message window size and the increased message window size.

In another example embodiment, the message window size 155 is considered the last known good value 180 and is stored in memory 150, and wherein the decrease in the increased message window size 155 is lower than the message window size 155, which results in a decreased message window size 155. Still other exemplary embodiments provide for sending a decreased number of messages corresponding to the decreased message window size 155. Based on the decreased message window size 155 a second expected message transfer time is identified (note: although there is a decreased number of messages sent, the second expected message transfer time may be an increase from the previous expected message transfer to compensate for network congestion), which defines an expected time limit between sending the decreased number of messages and receiving corresponding acknowledgement messages. Thereafter, an indication can be provided that the one or more corresponding acknowledgement messages for the decrease number of messages were received before the second expected message transfer time expired. As such, the size (i.e., the last know good value 180) of the message window size 155 can be retrieved from memory 150 and the decreased message window size 155 is then increased to the message window size 155.

Thereafter, exemplary embodiments provide for the fine tuning the message window size 155 by single adjustments (i.e., incremental increases and decreases) in the message window size 155. Other exemplary embodiments provide that the message window size 155 is considered the last known good value and the decrease in the increased message window size is the message window size 155.

Other exemplary embodiments provide that the corresponding acknowledgement messages may be batched into a single message. In such instance, the expected message transfer time is based on a mean and/or a variance for the expected message transfer time limit between sending the number of message and receiving the single message.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by and remote processing devices that are linked (either by hardwired links, wireless links, or by a combination of hardwired or wireless links) through a communications network. In a distributed computing environment, program modules may be located in both and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computing system within a Web Services (WS) environment, a method of efficiently transferring messages between endpoints in accordance with a Reliable Messaging of WS (RM-WS) protocol by dynamically determining a message window size for sending the messages based on an acceptor's available buffer size, the method comprising acts of:
   establishing, at an application layer, a sequence session between an initiator and an acceptor in accordance with a RM-WS protocol;
   receiving over the sequence session a message that includes acceptor buffer size information, which indicates an amount of available memory for buffering messages that are awaiting processing by an application, wherein the acceptor's total amount of memory allocated for buffering messages is dynamically configurable on a per connection basis, wherein the allocated amount of memory is based on at least one of a plurality of factors;
   identifying a number of in flight messages that have been sent to the acceptor without receiving corresponding acknowledgements in accordance with the RM-WS protocol; and
   using the acceptor buffer size information and the number of in flight messages to calculate a message window size, which represents an upper limit on a number of messages that can be sent to the acceptor in order to prevent resending messages due to buffer overrun.

2. The method of claim 1, wherein the message that includes the acceptor buffer size information is a RM-WS protocol infrastructure message.

3. The method of claim 2, wherein the acceptor's total memory allocated for buffering messages awaiting processing by the application is dynamically configurable on a per connection basis.

4. The method of claim 2, wherein based on the message window size being larger than zero the method further comprises an act of:
   sending a number of messages corresponding to the calculated message window size.

5. The method of claim 2, wherein based on the message window size being zero the method further comprises an act of:
   blocking messages from being sent until an infrastructure message is used to calculate that the message window size is greater than zero.

6. The method of claim 5, wherein the infrastructure message is an acknowledgment response message in accordance with the RM-WS protocol, the method further comprises an act of:
   periodically sending acknowledgment request messages to the acceptor; and
   receiving one or more acknowledgment response messages that include acceptor buffer size information for recalculating the message window size; and
   when the recalculated message window size is greater than zero, sending a number of messages corresponding to the recalculated message window size.

7. The method of claim 2, wherein the buffer information is in terms of the number of messages that can be sent, not the number of bytes available in memory.

8. The method of claim 2, wherein the RM-WS protocol is WSReliableMessaging.

9. The method of claim 2, wherein the infrastructure message is an acknowledgment message, which acknowledges receipt of one or more messages previously sent.

10. The method of claim 9, wherein the calculation of the message window size is further based on a number of messages acknowledged in the acknowledgment message.

11. The method of claim 10, wherein the calculation of the message window size is further based on a number of previously received acknowledgments for one or more previously sent messages.

12. At computing system within a Web Services (WS) environment, a computer program product for implementing a method of efficiently transferring messages between endpoints in accordance with a Reliable Messaging of WS (RM-WS) protocol by dynamically determining a message window size for sending the messages based on an acceptor's available buffer size, the computer program product comprising one or more computer readable storage media having stored thereon computer executable instructions that, when executed by a processor, can cause the messaging system to perform the following:
   establish, at an application layer, a sequence session between an initiator and an acceptor in accordance with a RM-WS protocol;
   receive over the sequence session a message that includes acceptor buffer size information, which indicates an amount of available memory for buffering messages that are awaiting processing by an application, wherein the acceptor's total amount of memory allocated for buffering messages is dynamically configurable on a per connection basis, wherein the allocated amount of memory is based on at least one of a plurality of factors;

identify a number of in flight messages that have been sent to the acceptor without receiving corresponding acknowledgements in accordance with the RM-WS protocol; and use the acceptor buffer size information and the number of in flight messages to calculate a message window size, which represents an upper limit on a number of messages that can be sent to the acceptor in order to prevent resending messages due to buffer overrun.

13. The computer program product of claim 12, wherein the message that includes the acceptor buffer size information is a RM-WS protocol infrastructure message.

14. The computer program product of claim 13, wherein the acceptor's total memory allocated for buffering messages awaiting processing by the application is dynamically configurable on a per connection basis.

15. The computer program product of claim 13, wherein based on the message window size being larger than zero, the computer program product further comprising computer executable instructions that can cause the messaging system to perform the following:

send a number of messages corresponding to the calculated message window size.

16. The computer program product of claim 13, wherein based on the message window size being zero, the computer program product further comprising computer executable instructions that can cause the messaging system to perform the following:

block messages from being sent until an infrastructure message is used to calculate that the message window size is greater than zero.

17. The computer program product of claim 16, wherein the infrastructure message is an acknowledgment response message in accordance with the RM-WS protocol, the computer program product further comprising computer executable instructions that can cause the messaging system to perform the following:

periodically send acknowledgment request messages to the acceptor; and receive one or more acknowledgment response messages that include acceptor buffer size information for recalculating the message window size; and when the recalculated message window size is greater than zero, send a number of messages corresponding to the recalculated message window size.

18. The computer program product of claim 13, wherein the buffer information is in terms of the number of messages that can be sent, not the number of bytes available in memory.

19. The computer program product of claim 13, wherein the RM-WS protocol is WSReliableMessaging.

20. The computer program product of claim 13, wherein the infrastructure message is an acknowledgment message, which acknowledges receipt of one or more messages previously sent.

21. The computer program product of claim 20, wherein the calculation of the message window size is further based on a number of messages acknowledged in the acknowledgment message.

22. The computer program product of claim 21, wherein the calculation of the message window size is further based on a number of previously received acknowledgments for one or more previously sent messages.

23. A computer system comprising the following:

a processor;

system memory;

an establishing module for establishing, at an application layer, a sequence session between an initiator and an acceptor in accordance with a RM-WS protocol;

a receiving module for receiving over the sequence session a message that includes acceptor buffer size information, which indicates an amount of available memory for buffering messages that are awaiting processing by an application, wherein the acceptor's total amount of memory allocated for buffering messages is dynamically configurable on a per session basis, wherein the allocated amount of memory is based on the results of a negotiation between the initiator and the acceptor;

an identifying module for identifying a number of in flight messages that have been sent to the acceptor without receiving corresponding acknowledgements in accordance with the RM-WS protocol; and a calculation module for using the acceptor buffer size information and the number of in flight messages to calculate a message window size, which represents an upper limit on a number of messages that can be sent to the acceptor in order to prevent resending messages due to buffer overrun.

* * * * *

UNITED STATES PATENT AND TRADEMARK OFFICE
CERTIFICATE OF CORRECTION

| | | |
|---|---|---|
| PATENT NO. | : 7,730,196 B2 | Page 1 of 1 |
| APPLICATION NO. | : 11/003848 | |
| DATED | : June 1, 2010 | |
| INVENTOR(S) | : Richard D. Hill et al. | |

It is certified that error appears in the above-identified patent and that said Letters Patent is hereby corrected as shown below:

In column 12, line 52, after "in" insert -- a --.

Signed and Sealed this
Tenth Day of May, 2011

David J. Kappos
*Director of the United States Patent and Trademark Office*